United States Patent
Wang

(10) Patent No.: US 7,760,964 B2
(45) Date of Patent: Jul. 20, 2010

(54) METHOD AND ARCHITECTURE FOR TEMPORAL-SPATIAL DEBLOCKING AND DEFLICKERING WITH EXPANDED FREQUENCY FILTERING IN COMPRESSED DOMAIN

(75) Inventor: Zhicheng Lancelot Wang, Los Altos, CA (US)

(73) Assignee: Ericsson Television Inc., Duluth, GA (US)

( * ) Notice: Subject to any disclaimer, the term of this patent is extended or adjusted under 35 U.S.C. 154(b) by 923 days.

(21) Appl. No.: 11/591,098

(22) Filed: Nov. 1, 2006

(65) Prior Publication Data

US 2008/0101720 A1    May 1, 2008

(51) Int. Cl.
*G06K 9/40* (2006.01)
*G06K 9/36* (2006.01)
*G06K 9/46* (2006.01)

(52) U.S. Cl. .................. 382/275; 382/232; 382/260

(58) Field of Classification Search .......... 382/275, 382/232, 260; 375/240.02, 240.03, 240.12, 375/240.18, 240.23, 240.24
See application file for complete search history.

(56) References Cited

U.S. PATENT DOCUMENTS

| | | | |
|---|---|---|---|
| 7,539,248 B2* | 5/2009 | Kwon et al. | 375/240.24 |
| 2006/0029135 A1* | 2/2006 | Zhou et al. | 375/240.12 |
| 2006/0126962 A1* | 6/2006 | Sun | 382/268 |
| 2006/0165181 A1* | 7/2006 | Kwan et al. | 375/240.24 |
| 2007/0025448 A1* | 2/2007 | Cha et al. | 375/240.24 |

* cited by examiner

*Primary Examiner*—Yon Couso
(74) *Attorney, Agent, or Firm*—Evan L. Kahn; Proskauer Rose LLP

(57) ABSTRACT

A deblocking/deflickering filter decreases artifacts produced in a block-based image compression system, wherein a plurality of transform coefficients are produced respectively indicative of different frequencies in input signal values. The filter includes a first filter portion for deblocking filtering a first low frequency one of the transform coefficients and a second filter portion for deblocking filtering a second low frequency one of the transform coefficients, the first low frequency being different from the second low frequency. The deblocking filter passes through at least a third one of the transform coefficients having a third frequency higher than both of the first and second frequencies without deblocking filtering.

35 Claims, 7 Drawing Sheets

METHOD AND ARCHITECTURE FOR TEMPORAL-SPATIAL DEBLOCKING AND DEFLICKERING WITH EXPANDED FREQUENCY FILTERING IN COMPRESSED DOMAIN

The present invention is directed to a unique universal deblocking and/or deflickering method and architecture usable as, for example, a loop filter in an encoder or a post-filter in a decoding path for noisy video transmission, video decoding, encoding, transrating, and homogenous and inhomogeneous transcoding environments.

BACKGROUND OF THE INVENTION

Block based transform compression is by far the most popular type of compression used in video and image coding standards and schemes. Its applications include, but are not limited to, broadcasting, DVD, Video-over-IP and video conferencing, due to the reduction of transmission bandwidth and storage space it enables. A highly advantageous example of such block transform based compression is the block based (usually, an 8×8 pixel block) discrete cosine transform (8×8 DCT), which provides near optimal energy compaction and signal orthogonal representation, and which is available with fast algorithms and implementations. Because of these advantages, the block based DCT is the dominant compression transform used in video compression standards such as MPEG-x (e.g., MPEG-2, MPEG-4 etc.), JPEGs, H.26x and others.

However, block-based transform compression techniques inherently introduce, difficulties, such as so-called blocky artifacts across the block boundaries as a result of the transformation and quantization of the data being performed independently, without consideration of the correlation between neighboring blocks and data. Another cause of blocky artifacts is the error arising from block based motion prediction/compensation, which causes reconstruction error in blocks having non-zero motion vectors associated therewith.

In block-based video coding schemes utilizing high compression ratios, the block artifacts appear more obvious. The blocky effects are more noticeable, and appear as grid noise, along the block boundaries in both smooth, homogenous areas and in busy areas with high motion activity.

Another problem that can arise from these block-based transform compression techniques is "flickering." This problem appears as a brief flash in the image as relatively large changes occur across block borders that are otherwise lacking in significant high frequency components. In other words, this is a temporal artifact arising from the block-based transform compression techniques. In accordance with the present invention, as described below, this block-based artifact may be removed or ameliorated by novel temporal filtering.

There are numerous conventional deblocking and/or deflickering methods known in the literature and from experimentation. These methods include, for example, special pixel domain deblocking filtering methods such as H.264 adaptive deblocking (loop) filtering. There has also been some investigation of deblocking methods that operate in the frequency domain. See, e.g., Chen et al., "*Adaptive Postfiltering of Transform Coefficients for the Reduction of Blocking Artifacts,*" *IEEE Trans. On Circuits and Systems for Video Technology*, Vol. 11, pp. 594-602 (May 2001). However, to the inventor's knowledge there have been no methods using temporal deblocking and/or deflickering processing in the frequency domain.

Thus, it has been found that current deblocking and/or deflickering methods generally produce unsatisfactory results in terms of subjective quality. The known methods also tend to be very expensive in computational and/or structural complexity, and therefore are unsuited for real-time implementations on ASIC, FPGA, DSP and other platforms.

SUMMARY OF THE INVENTION

The present invention is directed to a spatial-temporal deblocking and/or deflickering method and architecture usable in connection with block-based transform compression to provide high quality, fast processing performance and real-time implementation. It is advantageously utilized in, for example, block-based transform video decoding and before pre-processing in transcoding systems.

In particular, the present invention overcomes the problems arising from prior art video compression standards and algorithms that produce block-based and blocky artifacts that arise mainly as a result of DCT coefficient quantization noise and motion prediction error. The method and architecture of the present invention attacks and resolves the fundamental root of this block artifact problem, in providing temporal-spatial deblocking and/or deflickering filtering in accordance with the present invention, advantageously in the compressed frequency domain.

As described below, the advantageous deblocking and/or deflickering filtering in accordance with the present invention may be applied to many areas, including but not limited to decoding, encoding, transrating and transcoding systems and methods, as an advanced competitive solution for these markets.

DETAILED DESCRIPTION OF THE PREFERRED EMBODIMENTS

To enable a fuller appreciation of the advantages of the present invention, a more specific description of the prior art will now be given. As used in this specification and expressly as used in the claims, the terms "deblocking" and "deblocking filtering" will be used to refer to one and/or both of "deblocking" and "deflickering, i.e., spatial block-based artifacts and/or temporal block-based artifacts and their filtering, for purposes of brevity, although it is recognized in accordance with the present invention that these types of artifacts may arise from different causes and may be addressed in different ways.

The presence of blocking artifacts in block-based video and image compression systems usually arises from one of two sources: either from a data quantization level that is higher than the video signal redundancy threshold of the human visual model, or from independent prediction and quantization for each block of the image. In conventional DCT block based video and image compression standards and algorithms, the quantization tables are set ahead of time with a scale factor a fixed, multiple levels. This set up is naturally not able to handle video signal dynamics with an efficient level of compression for both a monotone area, having subtle signal differences, and a busy detail/motion activity area, having a high signal variance that arises from, for example, inaccurate motion prediction.

Conventional pixel domain block border filtering methods in most deblocking filters are intended to smooth the block boundaries by using selected ones of known conditional filters. The H.264 deblocking filter is a typical filter of this type, which tries to solve the surface effects of blocking by smoothing out the boundary and its details, resulting in the blurring and contouring of images. This type of deblocking filter also has high computational complexity and other undesirable properties for efficient implementation on parallel platform architectures such as VLIW (Very Long Instruction Word), SIMD (Single Instruction Multiple Data) and multi-engine/core parallel architecture platforms.

Based upon discrete cosine transform (DCT) theory and implementation, the following preferred embodiments of the present invention provide highly efficient spatial-temporal transform component methods and architectures for DCT block-based video encoding/decoding, transrating and transcoding applications and systems.

Figures 1, 3:
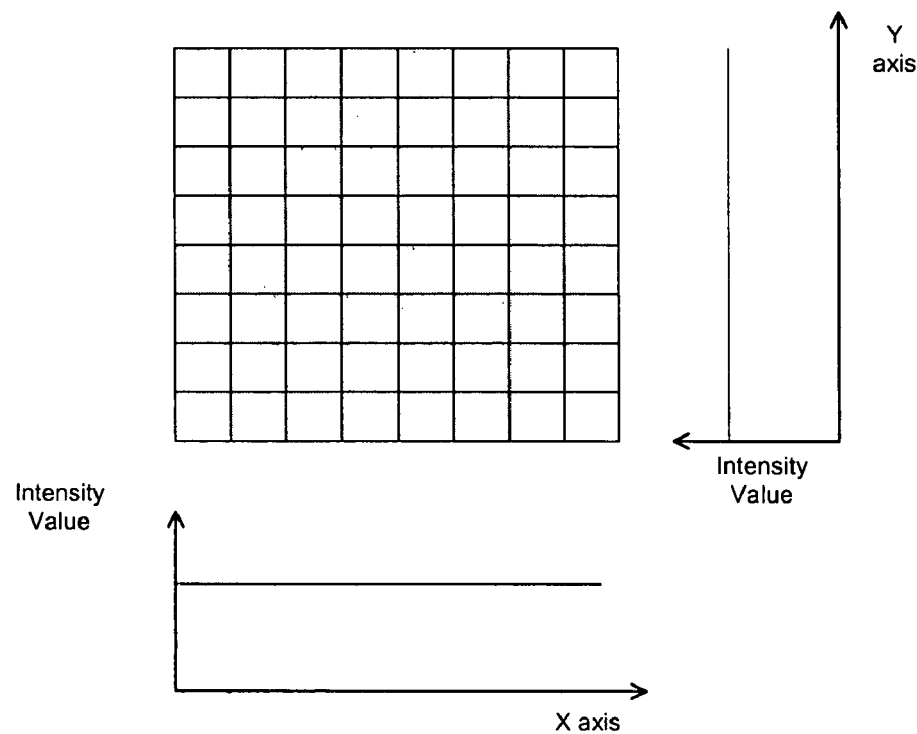
FIG. 1 is a view of an 8×8 block of DCT coefficients.
FIG. 3 is an expanded view of the DC(0,0) DCT coefficient effect.
Figure 2:
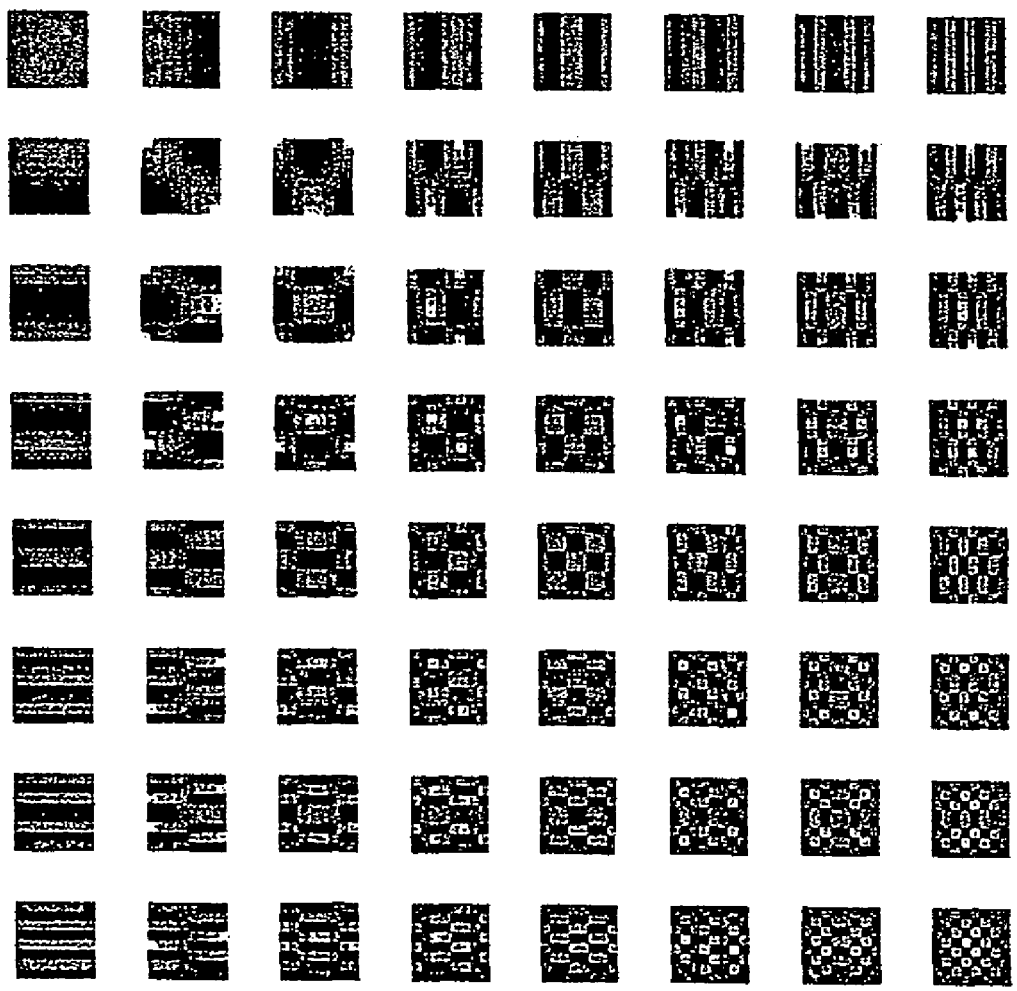
FIG. 2 is a view of the 64 DCT basis functions.

The major property of the well known block-based DCT used on most video compression standards and algorithms is the near-optimal compaction of energy in the transformed image into the low frequency channels (also called bins). This feature is illustrated in FIG. 1, which shows an 8×8 block 100 of DCT coefficients, i.e., the frequency domain, transformed from an 8×8 block of intensity (pixel) values, i.e., the spatial domain. The top left coefficient DC(0,0) represents the DC level, or average block background intensity level of the intensity values. Moving to the right, the AC coefficients represent higher horizontal frequencies; moving down, the AC coefficients represent higher vertical frequencies. The AC coefficient AC(7,7) at the bottom right represents the combination of the highest possible horizontal and vertical frequencies. FIG. 2 illustrates the 64 DCT coefficient basis functions, which are orthogonal to each other.

Figure 4:
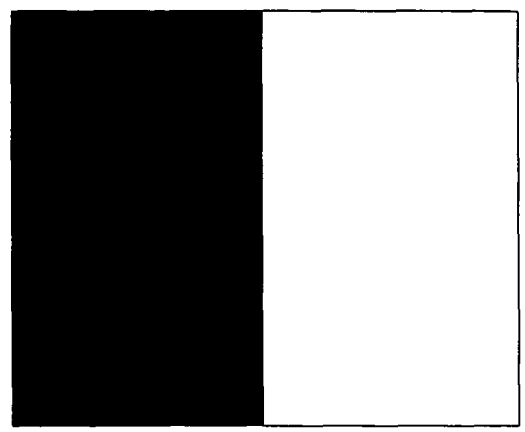
FIG. 4 is an expanded view of the AC(0,1) DCT coefficient effect.
Figure 4:
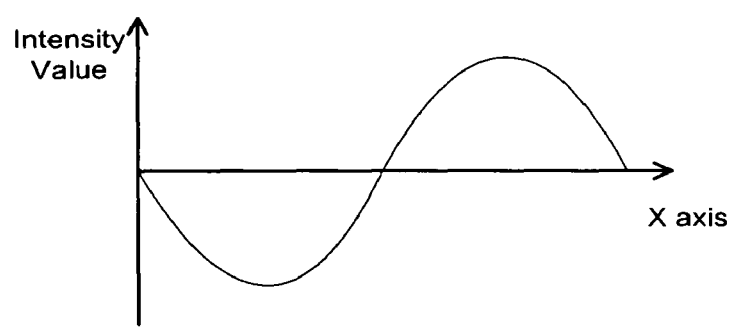
Figure 5:
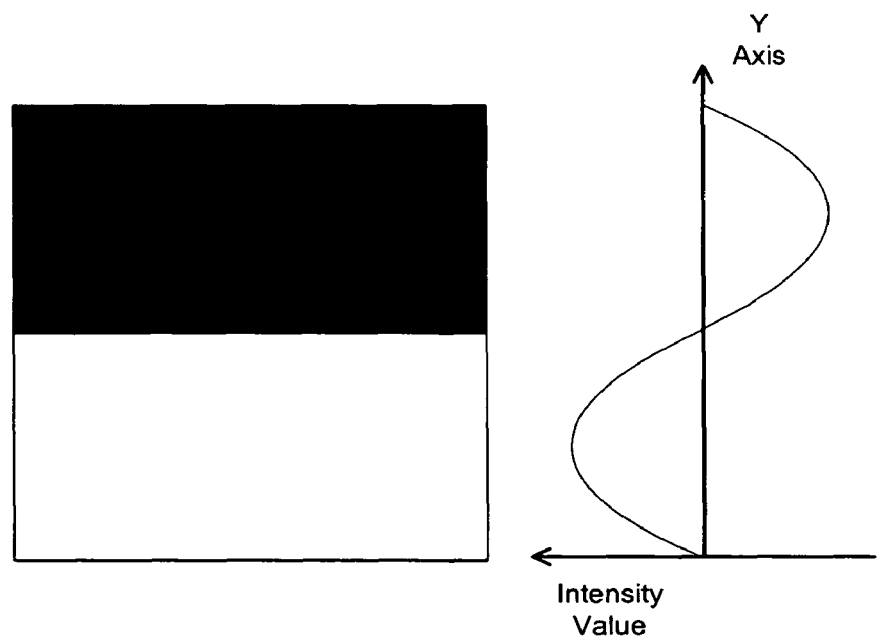
FIG. 5 is an expanded view of the AC(1,0) DCT coefficient effect.
Figure 6:
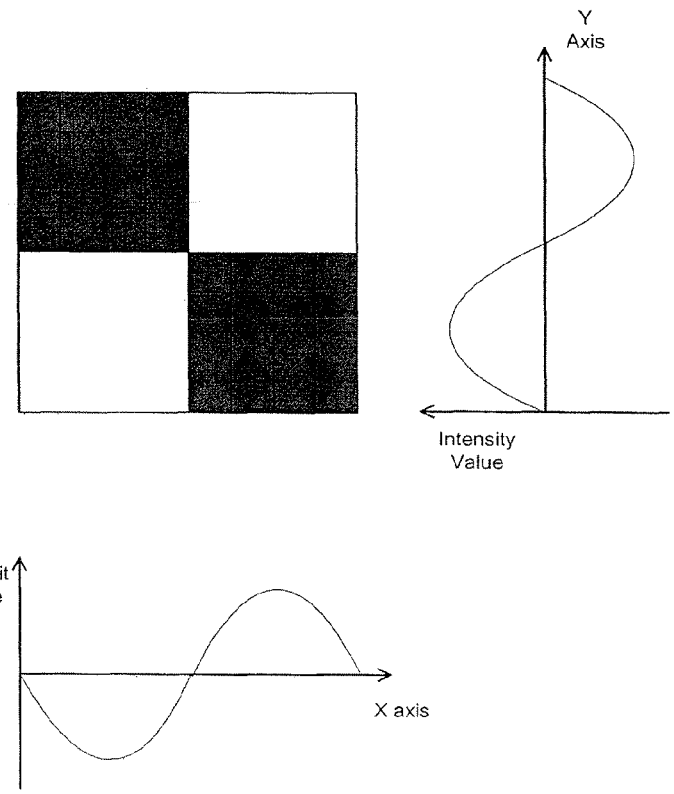
FIG. 6 is an expanded view of the AC(1,1) DCT coefficient effect.

FIG. 3 is an expanded view of effect of the DC coefficient DC(0,0) in the top left hand corner. FIG. 4 is an expanded view of effect of the AC coefficient A(0,1), FIG. 5 is an expanded view of effect of the AC coefficient A(1, 0), and FIG. 6 is an expanded view of effect of the AC coefficient A(1,1).

Each of the low frequency and high frequency coefficients can cause problems in image processing. Thus, the blocking and boundary effects are caused predominately by disconnection and miscorrelation of the DC and low frequency values between neighboring blocks and macroblocks in the same frame. Similarly, temporal flickering artifacts are mainly due to this sort of disconnection and miscorrelation of the DC and low frequency values, but between motion compensated blocks at the same locations in different frames.

On the other hand, the higher frequency AC values contribute more to the image details and edges, and also can give rise to problems. For example, the ring effect around image edges (the Gibb's phenomenon effect) is caused by an artificially high quantization of high frequency coefficients.

Because neighboring blocks in the spatial domain tend to have similar background intensity levels, the DC and low frequency AC coefficients tend to be correlated. Smoothing these correlated neighboring block DC coefficient levels can be a very effective method for removing deblocking artifacts in the image monotone and background areas where the blocking artifacts are most noticeable to the human visual system (HVS).

In the prior art methods, coarse quantization has been used, i.e. the range is divided up into a relatively small number of quantization levels. While such coarse quantization may be acceptable under certain conditions for the lower frequency DCT coefficients, it can produce unacceptable results, e.g., blurring, when applied to higher frequency DCT coefficients. Accordingly, finer quantization has been used for many DCT based compression standards and systems. Even with this adjustment, however, the basic approach to quantization remains the same for all the DCT coefficients. More specifically, the numerous spatial pixel deblocking postfilters in the literature smooth all frequency signals at the reconstructed image block boundaries, which results in ineffective and insufficient deblocking as well as blurring effects.

The present invention uniquely recognizes that the low frequency DCT coefficients need to be appropriately filtered, while at the same time the high frequency DCT coefficients need to be better preserved to keep the image details and edges. Thus, the present invention is directed to frequency domain spatial-temporal filtering. Advantageously, this novel filtering is embedded in the decoding path of a block-based DCT-based video compression system.

In the following discussion, the term "channel" shall refer to a specific frequency (DCT coefficient) location (in the DCT frequency domain) extending across the frames in sequence. For example, for the DCT coefficients, the DC channel (or, equivalently, the DC(0,0) channel) refers to the sequence of DC DCT coefficients in corresponding (e.g., adjacent) blocks or successive frames. Correspondingly, the AC(0,1) channel refers to the sequence of AC(0,1) coefficients in corresponding (e.g., adjacent) blocks or successive frames, and so forth.

As a first preferred embodiment of the present invention, a nearest spatial-temporal filter of low frequency channels is presented. Additional preferred embodiments incorporating alternative modifications and adaptive modes are described later.

Figure 7:
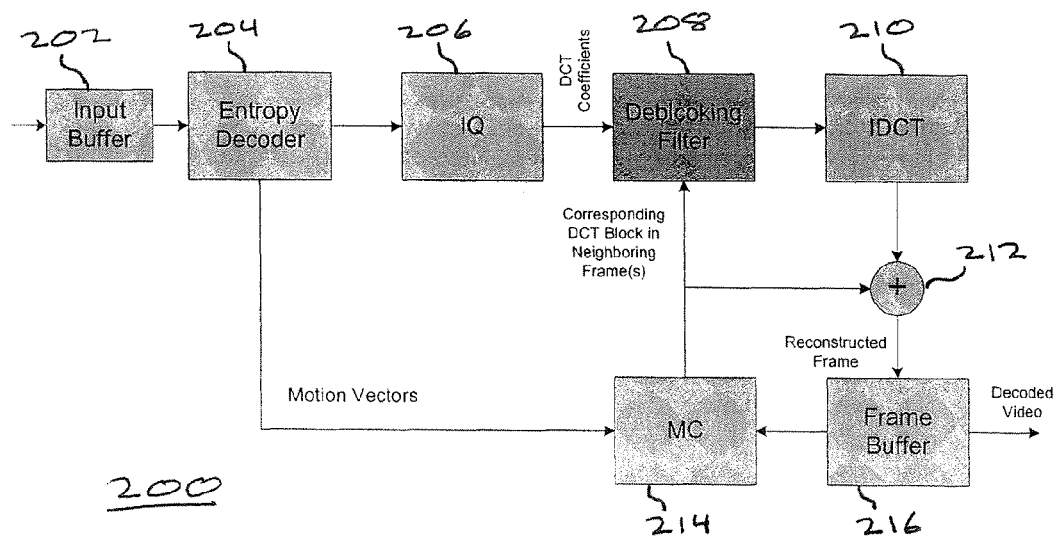
FIG. 7 is a block diagram of a decoder incorporating a deblocking filter in accordance with a first preferred embodiment of the present invention.

To directly address the problems of blocking, ring and flickering artifacts as discussed above, a preferred embodiment of the present invention is directed to a nearest spatial-temporal filtering for low frequency channels DC, A(0,1), A(1,0) and A(1,1). A block diagram of a decoder system 200 including this advantageous filtering is shown in FIG. 7. It will be understood that in the following discussion, all elements described are constructed and operate in accordance with conventional, well known principles, except where specifically indicated as being different in accordance with the present invention. Accordingly, no further description of the conventional elements and operations will be given.

Advantageously, the inventive deblocking filtering may be placed in an otherwise conventional decoding system 200 as a frequency filter after inverse quantization and before inverse DCT transformation. As shown in FIG. 7, the input bitstream including the encoded DCT coefficients is received at input buffer 202 and then provided to entropy decoder 204. The bit stream information is decoded and the decoded information is provided to inverse quantizer 206, which outputs the DCT coefficients to the inventive deblocking filter 208, discussed in more detail below. The filtered output is sent to inverse DCT transformer 210, and the recovered (differential) pixel intensities are sent to adder 212. Concurrently, the decoded motion vectors (for P, B pictures) are provided from entropy decoder 204 to motion compensator 214, which then receives a previous picture from frame buffer 216. Based on the motion vector for the current frame (for P, B pictures), motion compensator 210 selects the appropriate portion of the previous frame and supplies it to adder 212, which adds the (differential) signal intensities of the current frame to either the signal intensities of the previous frame (for P, B pictures) or passes through the signal intensities (for I pictures) to reconstruct the signal intensities of the current frame. The reconstructed frame may then be stored in frame buffer 216 to serve as a reference frame for a later frame, and is output for further processing and/or display. These operations are all under the control of a controller (not illustrated).

Figure 8:
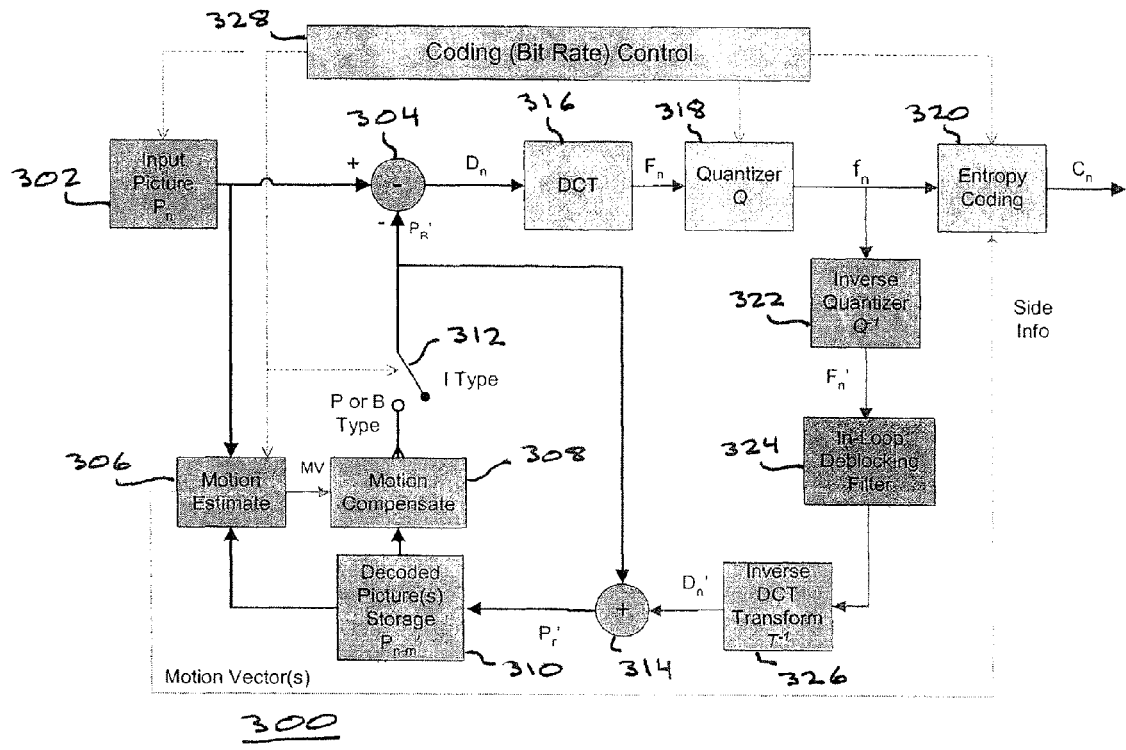
FIG. 8 is a block diagram of an encoder incorporating a deblocking filter in accordance with a second preferred embodiment of the present invention.

Correspondingly, the inventive deblocking filtering may be placed in an otherwise conventional encoding system 300 as a loop filter after inverse quantization and before inverse DCT transformation. As shown in FIG. 8, the input picture Pn at input 302 is provided to subtractor 304 and to motion estimator 306 for calculating motion vectors MV for P or B pictures. Motion compensator 308 receives one or more reference pictures from decoded picture storage 310 and outputs reference values Pn'. If the input picture is a P or B picture, switch 312 supplies the reference values Pn' to subtractor 304 and adder 314. The output Dn of the subtractor 304 is provided to DCT transformer 316, which outputs the coefficients Fn to quantizer 318 to provide quantized coefficients fn to entropy encoder 320 for coding as output Cn. The quantized coefficients fn are also provided to inverse quantizer 322, whose output Fn' is provided to the inventive deblocking filter 324. The filtered output is sent to inverse DCT transformer 326, and the recovered pixel intensities Dn' are sent to adder 314, wherein they are added to the reference intensities Pn' to regenerate a picture Pr' for P, B pictures, or provided directly for I pictures, for storage in decoded picture storage 310 for future use as a reference picture. These operations are all under the control of coding control 328.

The deblocking filter 208, 324 is not the conventional post-filter which is conventionally used to filter the reconstructed video signal. However, the inventive deblocking filter has the same universal property as the conventional filter, i.e., it can be applied to all block-based DCT compression standards and processes.

Figure 9:
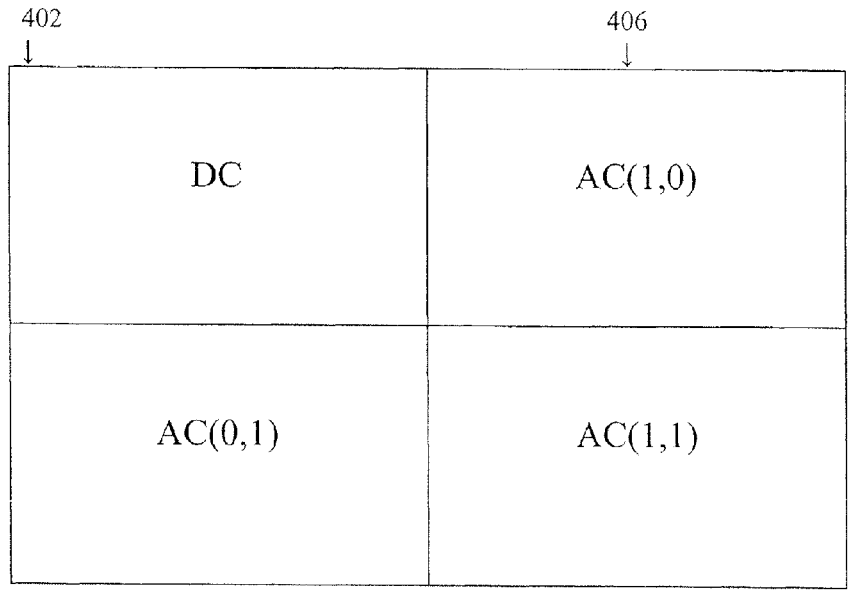
FIG. 9 is a conceptual diagram of a deblocking filter in accordance with a third preferred embodiment of the present invention.

While there are many embodiments of the deblocking filter in accordance with the present invention, a basic feature of this filter is that it does not filter all of the channels (coefficients) of the received signal in the same way. In significantly advantageous embodiments of the deblocking filter in accordance with the present invention, the embodiments only filter selected one of the low-frequency channels. As shown in FIG. 9, in a preferred embodiment, the deblocking filter 208, 324 is constructed as a filter 400 of four separate filter portions 402, 404, 406, 408, respectively filtering low frequency channels DC, A(0,1), A(1,0) and A(1,1). In some embodiments, each of these filter portions performs the same deblocking filtering process, but only upon a single channel. In other embodiments, the inventive deblocking filter may have other constructions and perform different filtering operations on the different channels, provided that the data of each channel is filtered separately and only the selected low frequency channels are so filtered. Of course, the structure of FIG. 9 can be made larger in the spatial domain. For example, if the block is a 16×16 block, the border effects may become even more important. In such case, more channels can be added and/or more coefficients can be processed within each channel.

Thus, in contrast to prior art methods and filters, not all 64 channels of a particular block may be filtered. Rather, only selected ones of the channels may be filtered, in particular only the lower-frequency channels. In the embodiments currently under discussion, only the four lowest frequency channels are subject to deblocking filtering. The remaining, higher frequency channels, containing higher frequency information (e.g., edges), may be left unfiltered or may be subject only to other types of filtering that do not produce the adverse effects of deblocking/deflickering filtering on high frequency DCT coefficients as discussed above.

The novel deblocking filtering does not exclude any other types of filtering on any or all of the channels.

Figure 10:
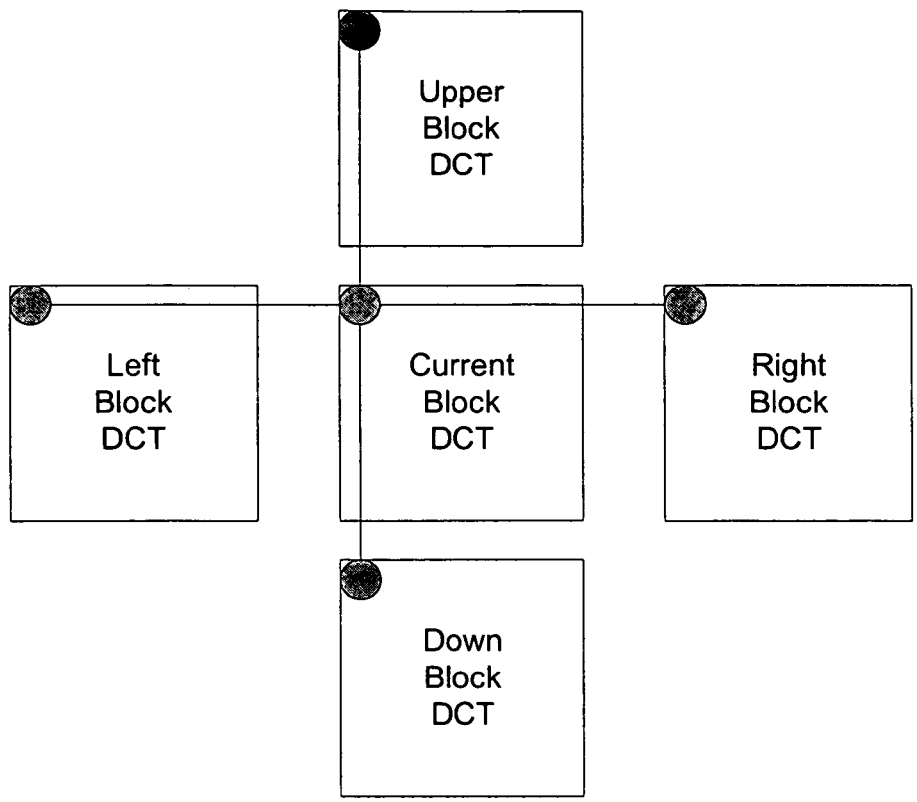
FIG. 10 is a conceptual diagram of a deblocking filter in accordance with a fourth preferred embodiment of the present invention.
Figure 11:
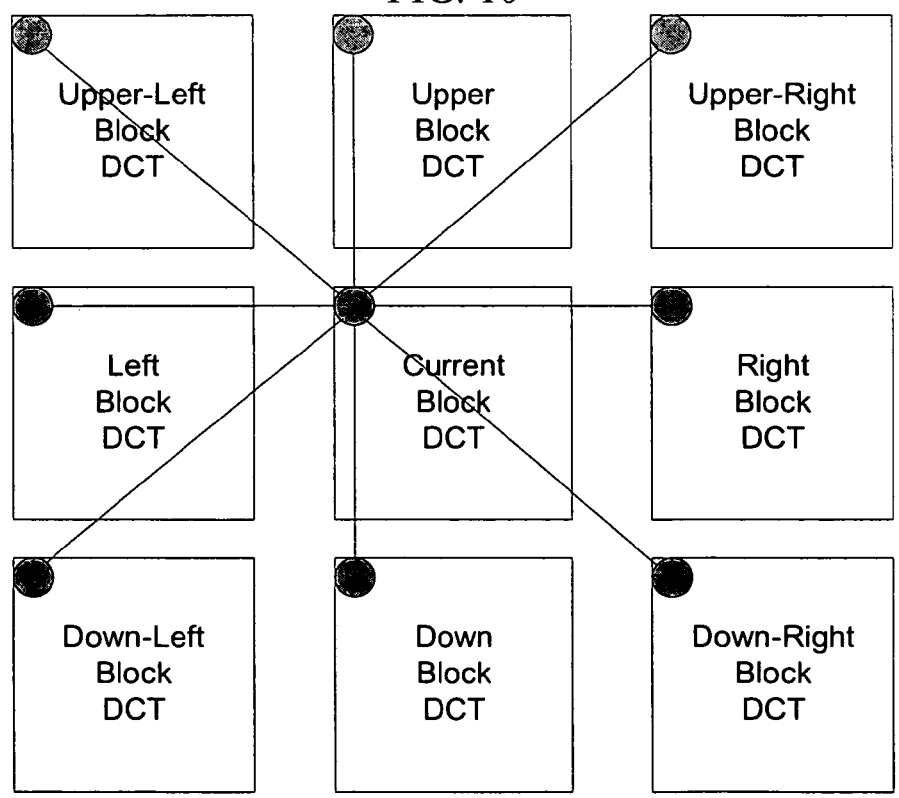
FIG. 11 is a conceptual diagram of a deblocking filter in accordance with a fifth preferred embodiment of the present invention.

The novel deblocking filter can operate across a selected number of blocks within each channel. In one embodiment, as shown in FIG. 10, the DCT for the current block for a particular channel, e.g., the DC coefficient, can be filtered using the corresponding DCTs for four adjacent blocks, i.e., the upper, down, left and right blocks. In another embodiment, as shown in FIG. 11, the DCT for the current block for a particular channel can be filtered using the corresponding DCTs for eight adjacent blocks, i.e., the upper-left, upper, upper-right, down-left, down, down-right, left and right blocks. Of course, any number of blocks in any selected arrangement including non-symmetrical arrangements may be used in the design of a particular deblocking filter in accordance with the present invention to achieve a desired advantageous result. Moreover, it is also possible to use different arrangements of blocks for different ones of the channels, should this be desired.

Figure 12:
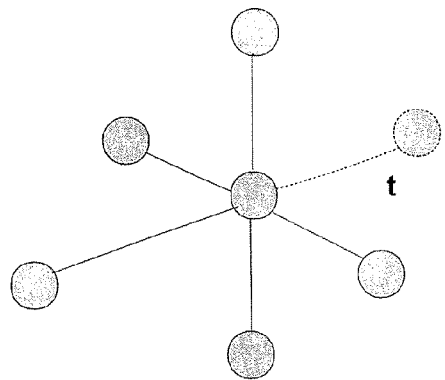
FIG. 12 is a conceptual diagram of a deblocking filter in accordance with a sixth preferred embodiment of the present invention.

FIG. 12 is a conceptual illustration of filtering in the temporal dimension (i.e., filtering in the same channel across multiple pictures in a sequence). In such a case, filtering may be processed across the forward (i.e., the following) picture, indicated by the arrow t1, and or across the backward (i.e., the preceding) picture, indicated by the arrow t2. Of course, filtering across more than one following or preceding picture may be chosen in accordance with the particular embodiment and desired results. Such temporal filtering may be particularly advantageous if the current block uses motion compensation and there is no scene change (spatial variation). The motion vector(s) may be used to identify the corresponding collocated block in the respective neighboring picture(s). However, as also shown in FIG. 12, filtering across the spatial dimensions may be combined with filtering across temporal dimensions, so that up to six different filtering dimensions may be used.

In addition to the different selection of directions and channels considered within the scope of the present invention, different methods of filtering may applied within these selections. In the following sections, a number of possible filtering methods are described. However, other filtering methods may of course be used within any of these selections, depending on the conditions and desired results.

The FIR Filter

As a first example, a conventional, 3-dimensional FIR low-pass spatial-temporal filter may advantageously be adapted for use as each of the filter portions for respective channels in an embodiment of the inventive deblocking filter will now be described. Of course, other constructions may alternatively be used depending on the desired result.

In the particularly advantageous structure shown in FIG. 7 discussed above, a nearest spatial-temporal filtering for low frequency channels (DC, AC(0,1), AC(1,0), AC(1,1)) can be used to deal with the problems of blocking, ring and flickering artifacts from their roots.

Anisotropic Diffusion Filter

In this example, a modified anisotropic diffusion filter is used for the spatial filter, with different Lorentzian functions for the DC and AC channels, respectively. Such modified anisotropic diffusion filters are known in other applications. See, e.g., Tsuji et al., "*A Combined Spatio-Temporal Anisotropic Diffusion For MPEG-Type Video Compression,*" ICIP-2002, September 2002.

The K value of the Lorentian function (in the following equation) as an edge-stopping function should decrease as the channel frequency increases.

$$g(x) = \frac{1}{1 + (2x/K)^2}$$

The linear partial differential equation for heat diffusion is calculated as follows:

$$C_s^{(n+1)} = C_s^{(n)} + \frac{1}{|\eta_s|} \sum_{p \in \eta_s} g(\nabla C_{s,p}^{(n)}) * \nabla C_{s,p}^{(n)},$$

$$\nabla C_{s,p}^{(n)} = C_p^{(n)} - C_s^{(n)},$$

Where $C_s^{(n)}$ represents the DCT coefficient value of a single channel at the center block $s=(x,y)$ position after the $n^{th}$ iteration of the above process.

Filtering with Block-Wise Gradient Prediction and Classification

In another embodiment of the present invention, a more efficient spatial-temporal block-wise gradient-based low-pass filter is provided for the smoothing of low-frequency DCT coefficients in the same channel for neighboring DCT blocks.

In this embodiment, in order to make the inventive deblocking filter adaptive to local image statistics, the distribution of high DCT coefficients is examined for image activity classification and filter parameter tuning. The statistical norm of a DCT block is calculated as follows:

$$D = \sum_{i=2}^{7} \sum_{j=2}^{7} |AC(i, j)|.$$

If a DCT block includes a lot of high-frequency detail, filtering is often disadvantageous because it can blur the edges and details. Moreover, in such a busy block, there is generally no purpose in filtering the low frequency channels, because those channels, representing the background level, are substantially unobservable anyway beneath the high frequency details. Therefore, if the statistical norm D calculated above is larger than a flatness threshold, the block is classified as a busy block with edges or details, and the deblocking filter can be turned off for that block. On the other hand, if D is less than or equal to the flatness threshold, the block is classified as a flat block, and the deblocking filter will be turned on.

In possible embodiments, either or both of the calculation of D (for instance how many DCT coefficients can be included, or the equations for calculating D and the flatness threshold, can be changed and tuned by experiments.

The gradient of DC coefficients with respect to neighboring DCT blocks is predicted by comparing the differences between the DC value of the current DCT block and the ones of its neighbor blocks. The gradients in different directions can be used to update the filter parameters adaptively.

$$\nabla C_{s,p} = C_p - C_s,$$

$$C_s(t) = \alpha * C_s(t-1) + (1-\alpha) \sum_{p \in \eta_s} \frac{1}{\nabla C_{s,p}} * C_p.$$

Where $0<\alpha<1$, and $C_s$ represents the DCT coefficient value of a single channel at the center block $s=(x,y)$ position. In a variation, the range of α can be made adaptive.

There are many advantageous systems in which the inventive deblocking filter may be used. A particularly advantageous example is a block DCT based video compression system, for example, MPEG-2 or MPEG-4. The inventive deblocking filter can be placed in the decoder as shown in FIG. 7. Of course, the inverse DCT transform in the decoder should be able to handle the filtered coefficients, and the appropriate quantization constraints should be applied.

The input data for the inventive deblocking filter in a preferred are the current DCT block coefficients, four low frequency DCT coefficients from each neighboring DCT block, the filter parameters, motion vector(s), and protocol interface with outside system.

The inventive deblocking filter may be fine tuned for each particular implementation. For example, the four different channel filters can be different not only in their filter parameters, but also in filter type. For instance, the DC channel filter can be strong low pass filter.

The proposed method and architecture described above is also very suitable for efficient parallel DSP implementation of VLIW and SIMD architecture platforms. The four channel filters can run efficiently in parallel on a DSP engine. The computation estimate of the filter in this implementation is about or below 10 MHz, more than 10 times faster than other current deblocking filters due to the block based filtering, even though there are four filters for each DCT block.

The effects of the signal phases of AC channels between different neighboring DCT blocks on blocking artifacts can also be applied to achieve preferred results.

The deblocking filter of the present invention is advantageously used in block DCT based video decoding and transcoding systems. It is also advantageously applicable to H.264 systems and other systems which use a DCT approximation transform, for example, the Integer Transform. It can also be used in a reconstruction loop of a block based video encoder.

The deblocking filter can be put into a decoder as a functional module shown in FIG. 7 to improve mainly subjective quality and objective quality of decoded (reconstructed) video image, particularly at low bit rates. Similarly, the deblocking filter can be put into a encoder as a loop-filter module shown in FIG. 8 to improve mainly subjective quality and objective quality of encoding process, particularly at low bit rates.

Figure 13:
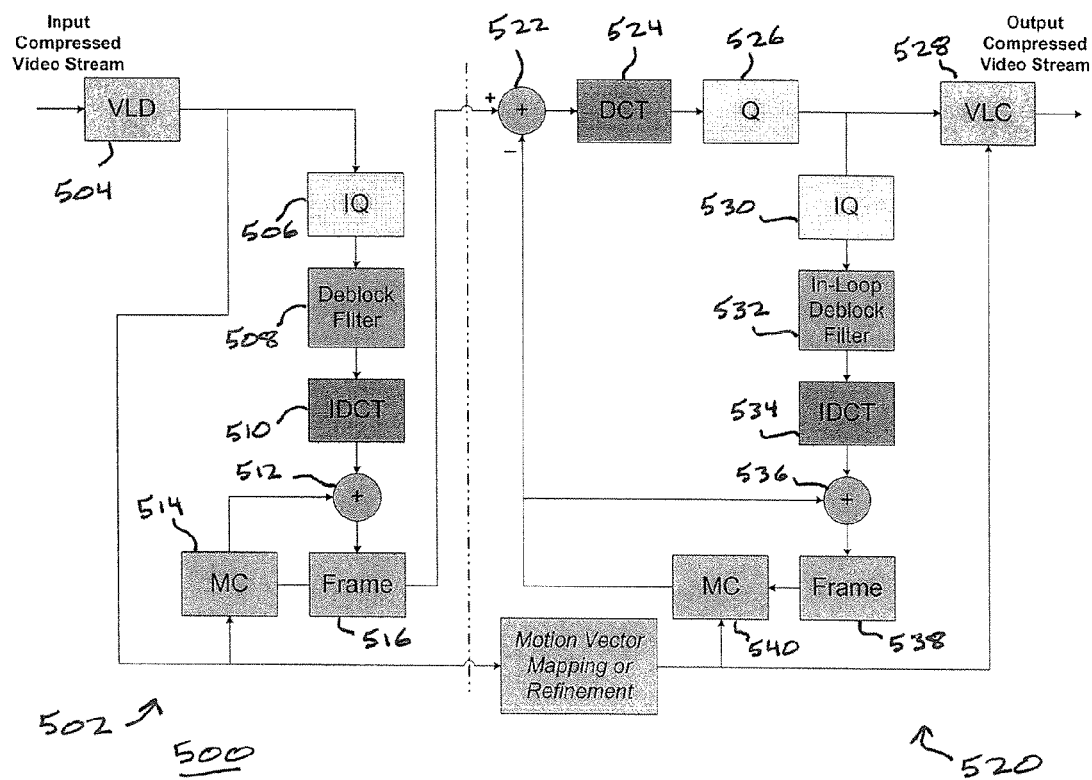
FIG. 13 is a block diagram of a transcoder incorporating two deblocking filters in accordance with a seventh preferred embodiment of the present invention.
Figure 7:
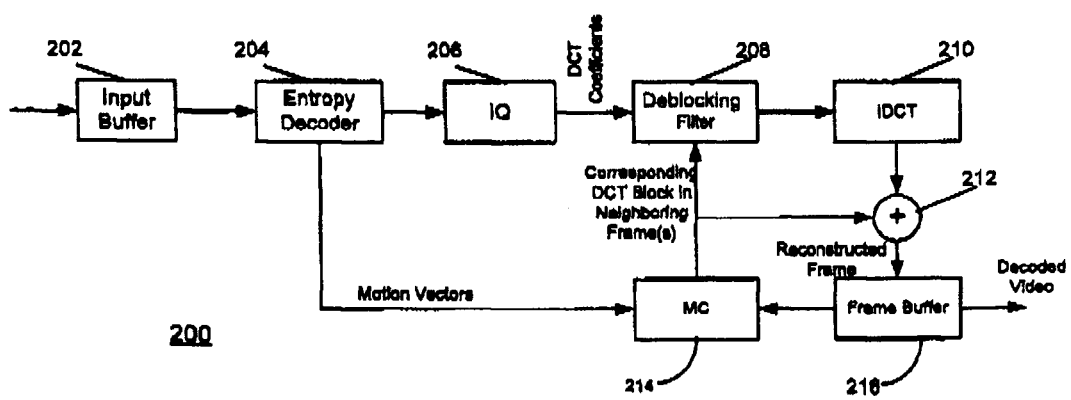

The deblocking filter can be used in two parts of a transcoder. FIG. 13 shows the proposed deblocking filter as used in a cascaded pixel-domain transcoder 500. In such a transcoder, the coded input stream is decoded in input section 502 (including VLD 504, IQ 506, the deblocking filter 508 of the present invention, IDCT 510, adder 512, MC 514 and frame storage 516. The decoded data is then recoded (i.e., in another coding system) in output section 520 (including subtractor 522, DCT 524, Q 526, VLC 528, IQ 530, the deblocking filter 532 of the present invention, IDCT 534, adder 536, frame storage 538 and MC 540, with motion vector mapping or refinement). As in the encoding/decoding embodiments discussed above, the elements and arrangement of the transcoder 500 elements are conventional with the exception of the deblocking filters 508, 532, and therefore the conventional features will not be further described.

While the present discussion has described the deblocking/deflickering filter of the present invention in connection with certain features already available on conventional systems, it will be understood that the scope of the present invention includes deblocking/deflickering filters including the aspects thereof discussed above in combination with any compatible feature, both features of conventional systems and features of systems to be developed.

In summary, the deblocking/deflickering filter of the present invention is both highly efficient and effective in removing artifacts such as blocky artifacts and temporal flicking artifacts. It also presents advantages in speed and/or resources, such as being implementable to be ten times faster than the H.264 Adaptive deblocking filter on TI C64x DSP platforms. The deblocking filter of the present invention also provides better subjective quality, instead of simply smoothing the boundary areas of blocks, as in conventional systems.

Furthermore, the deblocking/deflickering filter of the present invention saves substantial computing cycles or elements including logics, memory resources, data access and/or bandwidth. It is a natural fit for other systems, such as the Microsoft VC1 video compression scheme and format.

The present invention has been described above in connection with many embodiments. It will of course be recognized by those of ordinary skill in the art that many variations and modifications may be made without departing from the scope of the invention, and all such variations and modifications should be considered to be within the scope of the following claims.

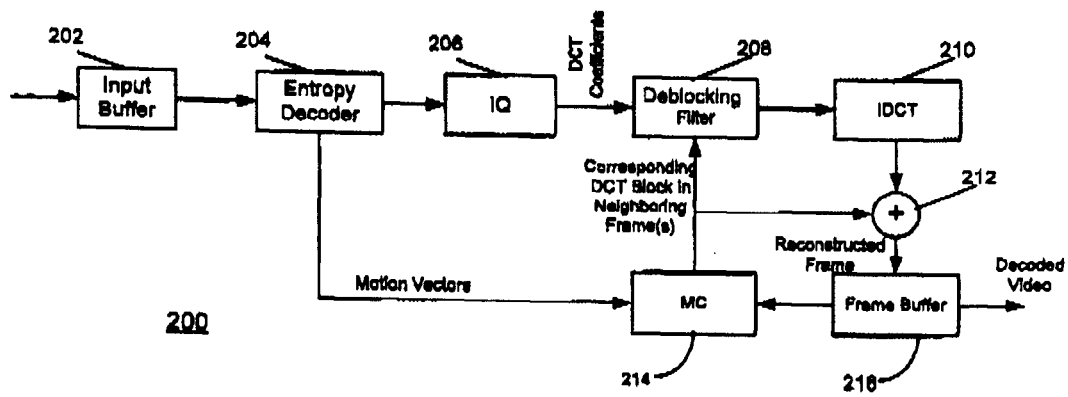

I claim:

1. A deblocking filter for decreasing artifacts produced in a block-based image compression system, wherein a plurality of transform coefficients are produced respectively indicative of different frequencies in input signal values, said filter comprising:
   a first filter portion for deblocking filtering a first low frequency one of the transform coefficients; and
   a second filter portion for deblocking filtering a second low frequency one of the transform coefficients, a first frequency of the first low frequency one of the transform coefficients being different from a second frequency of the second low frequency one of the transform coefficients,
   wherein said deblocking filter passes through at least a third one of the transform coefficients having a third frequency higher than both of the first and second frequencies without deblocking filtering.

2. The deblocking filter of claim 1, wherein the first low frequency one of the transform coefficients is the lowest frequency transform coefficient.

3. The deblocking filter of claim 2, wherein the second low frequency one of the transform coefficients is the second lowest frequency transform coefficient.

4. The deblocking filter of claim 3, wherein the third low frequency one of the transform coefficients is at least as high frequency as the third lowest frequency transform coefficient.

5. The deblocking filter of claim 1, wherein each of said first and second filter portions perform a same deblocking filtering operation.

6. The deblocking filter of claim 1, wherein each of said first and second filter portions perform a different deblocking filtering operation.

7. A deblocking filter for decreasing artifacts produced in a block-based image compression system, wherein a plurality of transform coefficients are produced respectively indicative of different frequencies in input signal values, said filter comprising:
   a first filter portion for deblocking filtering a lowest frequency one of the transform coefficients;
   a second filter portion for deblocking filtering a second lowest frequency one of the transform coefficients;
   a third filter portion for deblocking filtering a third lowest frequency one of the transform coefficients; and
   a fourth filter portion for deblocking filtering a fourth lowest frequency one of the transform coefficients;
   wherein said deblocking filter passes through at least a fifth one of the transform coefficients having a fifth frequency higher than the fourth frequency without deblocking filtering.

8. The deblocking filter of claim 7, wherein the lowest frequency one of the transform coefficients is a DC transform coefficient.

9. The deblocking filter of claim 8, wherein the second lowest frequency one of the transform coefficients is an AC(0, 1) transform coefficient.

10. The deblocking filter of claim 9, wherein the third lowest frequency one of the transform coefficients is an AC(1, 0) transform coefficient.

11. The deblocking filter of claim 10, wherein the fourth lowest frequency one of the transform coefficients is an AC(1, 1) transform coefficient.

12. A method of deblocking filtering for decreasing artifacts produced in a block-based image compression system, wherein a plurality of transform coefficients are produced respectively indicative of different frequencies in input signal values, said method comprising the steps of:
   in a block-based image processing system, deblocking filtering a first low frequency one of the transform coefficients; and
   in the block-based image processing system, deblocking filtering a second low frequency one of the transform coefficients, a first frequency of the first low frequency one of the transform coefficients being different from a second frequency of the second low frequency one of the transform coefficients,
   wherein said deblocking method passes through at least a third one of the transform coefficients having a third frequency higher than both of the first and second frequencies without deblocking filtering.

13. The deblocking method of claim 12, wherein the first low frequency one of the transform coefficients is the lowest frequency transform coefficient.

14. The deblocking method of claim 13, wherein the second low frequency one of the transform coefficients is the second lowest frequency transform coefficient.

15. The deblocking method of claim 14, wherein the third low frequency one of the transform coefficients is at least as high frequency as the third lowest frequency transform coefficient.

16. The deblocking method of claim 12, wherein each of said first and second filterings performs a same deblocking filtering operation.

17. The deblocking method of claim 12, wherein each of said first and second filters performs a different deblocking filtering operation.

18. A method of deblocking filtering for decreasing artifacts produced in a block-based image compression system, wherein a plurality of transform coefficients are produced respectively indicative of different frequencies in input signal values, said method comprising the steps of:
in a block-based image processing system, deblocking filtering a lowest frequency one of the transform coefficients;
in the block-based image processing system, deblocking filtering a second lowest frequency one of the transform coefficients;
in the block-based image processing system, deblocking filtering a third lowest frequency one of the transform coefficients; and
in the block-based image processing system, deblocking filtering a fourth lowest frequency one of the transform coefficients;
wherein said deblocking method passes through at least a fifth one of the transform coefficients having a fifth frequency higher than the fourth frequency without deblocking filtering.

19. The deblocking method of claim 18, wherein the lowest frequency one of the transform coefficients is a DC transform coefficient.

20. The deblocking method of claim 19, wherein the second lowest frequency one of the transform coefficients is an AC(0,1) transform coefficient.

21. The deblocking method of claim 20, wherein the third lowest frequency one of the transform coefficients is an AC(1,0) transform coefficient.

22. The deblocking method of claim 21, wherein the fourth lowest frequency one of the transform coefficients is an AC(1,1) transform coefficient.

23. A deblocking filter for decreasing artifacts produced in a block-based image compression system, said filter comprising:
a transformer for transforming a block of n signal values into a block of m transform coefficients, each of the transform coefficients being indicative of a different spatial frequency in the block of signal values;
a first filter portion for deblocking filtering a first low frequency one of the transform coefficients; and
a second filter portion for deblocking filtering a second low frequency one of the transform coefficients, a first frequency of the first low frequency one of the transform coefficients being different from a second frequency of the second low frequency one of the transform coefficients,
wherein said deblocking filter passes through at least a third one of the transform coefficients having a third frequency higher than both of the first and second frequencies without deblocking filtering.

24. The deblocking filter of claim 23, wherein:
the transformer performs a DCT transform on the block of n signal values to produce m DCT coefficients including a DC(0,0) coefficient and m−1 AC coefficients in increasing frequency order;
said first filter portion deblocking filters the DC(0,0) coefficient; and
said second filter portion deblocking filters one of the AC coefficients.

25. The deblocking filter of claim 24, wherein:
the AC coefficients include an AC(0,1) coefficient, an AC(1,0) coefficient and an AC(1,1) coefficient; and
said second filter portion deblocking filters the AC(0,1) coefficient;
said deblocking filter further comprising:
a third filter portion for deblocking filtering the AC(1,0) coefficient; and
a fourth filter portion for deblocking filtering the AC(1,1) coefficient.

26. The deblocking filter of claim 25, wherein each of said first, second, third and fourth filter portions perform a same deblocking filtering operation.

27. The deblocking filter of claim 25, wherein at least two of said first, second, third and fourth filter portions perform different deblocking filtering operations from each other.

28. The deblocking filter of claim 23, wherein:
the block of signal values is a current image block of an image picture including a plurality of other image blocks, each of the plurality of other image blocks being transformed into a respective other block of DCT coefficients including a respective DC(0,0) coefficient; and
said first filter portion performs its deblocking filtering based on the DC(0,0) coefficient of at least one of the other blocks of DCT coefficients.

29. The deblocking filter of claim 23, wherein:
the block of signal values is a current image block of a current image picture, and the current image picture being one in a sequence of other image picture including a plurality of other image blocks, each of the sequence of other image pictures including at least a block transformed into a respective other block of DCT coefficients including a respective DC(0,0) coefficient; and
said first filter portion performs its deblocking filtering based on the DC(0,0) coefficient of the DC(0,0) coefficient of at least one of the other pictures.

30. A decoder comprising a deblocking filter for decreasing artifacts produced in a block-based image compression system, wherein a plurality of transform coefficients are produced respectively indicative of different frequencies in input signal values, said filter comprising:
a first filter portion for deblocking filtering a first low frequency one of the transform coefficients; and
a second filter portion for deblocking filtering a second low frequency one of the transform coefficients, a first frequency of the first low frequency one of the transform coefficients being different from a second frequency of the second low frequency one of the transform coefficients,
wherein said deblocking filter passes through at least a third one of the transform coefficients having a third frequency higher than both of the first and second frequencies without deblocking filtering.

31. An encoder comprising a deblocking filter for decreasing artifacts produced in a block-based image compression system, wherein a plurality of transform coefficients are produced respectively indicative of different frequencies in input signal values, said filter comprising:

a first filter portion for deblocking filtering a first low frequency one of the transform coefficients; and a second filter portion for deblocking filtering a second low frequency one of the transform coefficients, a first frequency of the first low frequency one of the transform coefficients being different from a second frequency of the second low frequency one of the transform coefficients, wherein said deblocking filter passes through at least a third one of the transform coefficients having a third frequency higher than both of the first and second frequencies without deblocking filtering.

32. A transcoder comprising a deblocking filter for decreasing artifacts produced in a block-based image compression system, wherein a plurality of transform coefficients are produced respectively indicative of different frequencies in input signal values, said filter comprising:

a first filter portion for deblocking filtering a first low frequency one of the transform coefficients; and a second filter portion for deblocking filtering a second low frequency one of the transform coefficients, a first frequency of the first low frequency one of the transform coefficients being different from a second frequency of the second low frequency one of the transform coefficients, wherein said deblocking filter passes through at least a third one of the transform coefficients having a third frequency higher than both of the first and second frequencies without deblocking filtering.

33. A deblocking filter for decreasing artifacts produced in a block-based image compression system, wherein a plurality of transform coefficients are produced respectively indicative of different frequencies in input signal values, said filter comprising:

a first filter portion for deblocking filtering a first low frequency one of the transform coefficients; and a second filter portion for deblocking filtering a second low frequency one of the transform coefficients, a first frequency of the first low frequency one of the transform coefficients being different from a second frequency of the second low frequency one of the transform coefficients, wherein said deblocking filter passes through at least a third one of the transform coefficients having a third frequency higher than both of the first and second frequencies without deblocking filtering, and wherein at least one of said first and second filter portions performs an FIR lowpass filtering operation on the respective one of the transform coefficients.

34. A deblocking filter for decreasing artifacts produced in a block-based image compression system, wherein a plurality of transform coefficients are produced respectively indicative of different frequencies in input signal values, said filter comprising:

a first filter portion for deblocking filtering a first low frequency one of the transform coefficients; and a second filter portion for deblocking filtering a second low frequency one of the transform coefficients, a first frequency of the first low frequency one of the transform coefficients being different from a second frequency of the second low frequency one of the transform coefficients, wherein said deblocking filter passes through at least a third one of the transform coefficients having a third frequency higher than both of the first and second frequencies without deblocking filtering, and wherein at least one of said first and second filter portions performs an anisotropic diffusion filtering operation on the respective one of the transform coefficients.

35. A deblocking filter for decreasing artifacts produced in a block-based image compression system, wherein a plurality of transform coefficients are produced respectively indicative of different frequencies in input signal values, said filter comprising:

a first filter portion for deblocking filtering a first low frequency one of the transform coefficients; and a second filter portion for deblocking filtering a second low frequency one of the transform coefficients, a first frequency of the first low frequency one of the transform coefficients being different from a second frequency of the second low frequency one of the transform coefficients, wherein said deblocking filter passes through at least a third one of the transform coefficients having a third frequency higher than both of the first and second frequencies without deblocking filtering, and wherein at least one of said first and second filter portions performs a filtering operation with block-wise gradient prediction and classification on the respective one of the transform coefficients.

* * * * *

UNITED STATES PATENT AND TRADEMARK OFFICE
CERTIFICATE OF CORRECTION

| | | |
|---|---|---|
| PATENT NO. | : 7,760,964 B2 | Page 1 of 3 |
| APPLICATION NO. | : 11/591098 | |
| DATED | : July 20, 2010 | |
| INVENTOR(S) | : Wang | |

It is certified that error appears in the above-identified patent and that said Letters Patent is hereby corrected as shown below:

The title page showing the illustrative figure should be deleted to be replaced with the attached title page.

The drawing sheet, consisting of Fig. 7, should be deleted to be replaced with the drawing sheet, consisting of Fig. 7, as shown on the attached page.

In the drawings:

In Fig. 6, Sheet 4 of 7, delete "Intensit" and insert -- Intensity --, therefor.

Column 7, Line 23, delete "Lorentian" and insert -- Lorentzian --, therefor.

Signed and Sealed this

Thirteenth Day of September, 2011

David J. Kappos
*Director of the United States Patent and Trademark Office*

(12) United States Patent
Wang

(10) Patent No.: US 7,760,964 B2
(45) Date of Patent: Jul. 20, 2010

(54) METHOD AND ARCHITECTURE FOR TEMPORAL-SPATIAL DEBLOCKING AND DEFLICKERING WITH EXPANDED FREQUENCY FILTERING IN COMPRESSED DOMAIN

(75) Inventor: Zhicheng Lancelot Wang, Los Altos, CA (US)

(73) Assignee: Ericsson Television Inc., Duluth, GA (US)

( * ) Notice: Subject to any disclaimer, the term of this patent is extended or adjusted under 35 U.S.C. 154(b) by 923 days.

(21) Appl. No.: 11/591,098

(22) Filed: Nov. 1, 2006

(65) Prior Publication Data
US 2008/0101720 A1 May 1, 2008

(51) Int. Cl.
*G06K 9/40* (2006.01)
*G06K 9/36* (2006.01)
*G06K 9/46* (2006.01)

(52) U.S. Cl. ................... 382/275; 382/232; 382/260

(58) Field of Classification Search ............ 382/275, 382/232, 260; 375/240.02, 240.03, 240.12, 375/240.18, 240.23, 240.24
See application file for complete search history.

(56) References Cited

U.S. PATENT DOCUMENTS

| | | | | |
|---|---|---|---|---|
| 7,539,248 B2 * | 5/2009 | Kwon et al. | ........... | 375/240.24 |
| 2006/0029135 A1 * | 2/2006 | Zhou et al. | ........... | 375/240.12 |
| 2006/0126962 A1 * | 6/2006 | Sun | ........... | 382/268 |
| 2006/0165181 A1 * | 7/2006 | Kwan et al. | ........... | 375/240.24 |
| 2007/0025448 A1 * | 2/2007 | Cha et al. | ........... | 375/240.24 |

* cited by examiner

*Primary Examiner*—Yon Couso
(74) *Attorney, Agent, or Firm*—Evan L. Kahn; Proskauer Rose LLP

(57) ABSTRACT

A deblocking/deflickering filter decreases artifacts produced in a block-based image compression system, wherein a plurality of transform coefficients are produced respectively indicative of different frequencies in input signal values. The filter includes a first filter portion for deblocking filtering a first low frequency one of the transform coefficients and a second filter portion for deblocking filtering a second low frequency one of the transform coefficients, the first low frequency being different from the second low frequency. The deblocking filter passes through at least a third one of the transform coefficients having a third frequency higher than both of the first and second frequencies without deblocking filtering.

35 Claims, 7 Drawing Sheets